United States Patent [19]

Jevec et al.

[11] Patent Number: 5,587,025
[45] Date of Patent: Dec. 24, 1996

[54] NUCLEAR STEAM GENERATOR CHEMICAL CLEANING PASSIVATION SOLUTION

[75] Inventors: John M. Jevec, Uniontown, Ohio; Randall P. Dow, Lynchburg, Va.

[73] Assignees: Framatome Technologies, Inc., Lynchburg, Va.; The Babcock & Wilcox Company, New Orleans, La.

[21] Appl. No.: 408,670

[22] Filed: Mar. 22, 1995

[51] Int. Cl.$^6$ .................................................. C23C 22/60
[52] U.S. Cl. .................................... 148/274; 134/3; 134/2
[58] Field of Search .................................. 148/274; 134/2, 134/3

[56] References Cited

U.S. PATENT DOCUMENTS

| | | | |
|---|---|---|---|
| 3,330,771 | 7/1967 | Komatsu et al. | 252/301.1 |
| 3,413,160 | 11/1968 | Teumac | 148/274 |
| 3,506,576 | 4/1970 | Teumac | 252/82 |
| 4,329,224 | 5/1982 | Kim | 210/709 |
| 4,409,119 | 10/1983 | Bürger et al. | 252/156 |
| 4,443,268 | 4/1984 | Cook | 134/2 |
| 4,524,001 | 6/1985 | Joubert | 210/713 |
| 4,632,705 | 12/1986 | Baum | 134/3 |
| 4,636,327 | 1/1987 | Frenier | 148/274 |
| 4,654,200 | 3/1987 | Nirdosh et al. | 423/2 |
| 4,681,705 | 7/1987 | Robertson | 252/631 |
| 4,693,833 | 9/1987 | Toshikuni et al. | 210/759 |
| 5,225,087 | 7/1993 | Kardos | 210/713 |

OTHER PUBLICATIONS

W. Frenier et al., "Passivation of Steel in Ammonium EDTA Solutions", NACE Corrosion 85, Boston, Mass., Mar. 25, 1985 pp. 189/1–189/16.

*Primary Examiner*—Sam Silverberg
*Attorney, Agent, or Firm*—Daniel S. Kalka; Robert J. Edwards

[57] ABSTRACT

A method for passivating the surfaces of a nuclear steam generator and a solution therefor includes EDTA and hydrogen peroxide in a temperature range of 37° C. to 49° C. The solution is adjusted to have a pH of between about 9.2 and 9.5 and used on the surfaces for two hours or more for passivating the surfaces.

4 Claims, No Drawings

NUCLEAR STEAM GENERATOR CHEMICAL CLEANING PASSIVATION SOLUTION

BACKGROUND OF THE INVENTION

1. Field of the Invention

The present invention relates in general to the technique of passivation, and in particular to a new and useful process and solution for passivating metal surfaces in a nuclear steam generator.

2. Description of the Related Art

Passivation can be defined in simple terms as the process which causes the loss of chemical reactivity in certain chemical environments. A detailed discussion of passivation can be found in M. G. Fontana and Greene, *Corrosion Engineering*, 2nd Edition, New York, N.Y.: McGraw-Hill, 1978, pp 319–324. Several important points are provided in this reference. First, it is evident that passivation is a state where corrosion of a metal in the environment under question is very low. Secondly, the passivation is relatively unstable and is specific to the environment. It is therefore important to understand the purpose of the passivating solution applied after chemical cleaning.

After being chemically cleaned with acids or other solvents designed to remove metal oxides, metal surfaces, especially ferrous based steels, are usually in a highly active state in which they are subject to rapid oxidation in the presence of air. This is often referred to as "flash rusting" or "after rust." The normal purpose of passivation after chemical cleaning is to prevent this flash rusting. Passivation solutions are generally directed to the ferrous based steel materials. The passivation potentials of nickel-based alloys such as Inconel 600, Monel 400, Incoloy 800, or Inconel 690, are much lower than that of iron. These high nickel alloys are essentially self-passivating, spontaneously forming a protective oxide film when exposed to air. The chemical cleaning passivation solution is aimed at preventing flash rusting on steam generator surfaces after chemical cleaning. This becomes especially important in the case where additional maintenance work is required which will result in the cleaned surfaces being exposed to the air. Once the cleaned units are put back into operation, the materials experience a different environment. The chemical cleaning passivation layer is no longer important. The water chemistry employed during operation is designed to promote passivation of the metal surfaces under the operating conditions of the steam generating equipment.

The EPRI/SGOG process utilizes a high temperature (93° C./200° F.) hydrazine solution as the final passivation step after chemical cleaning of the nuclear steam generators. The EPRI/SGOG passivation solution contains approximately 200 ppm of hydrazine with the pH adjusted to about 10.2 with ammonia. This solution has been demonstrated to provide the appropriate passive layer after chemical cleaning (R. D. Martin and W. P. Banks, "Electrochemical Investigation of Passivating Systems," *Proceedings of the 35th IWC*, Pittsburgh, Pa., 1974, pp 169–179 and R. D. Martin and W. P. Banks, "Electrochemical Investigation of Passivating Mild Steel Surfaces," *Materials Performance*, Vol 14, Nov. 9, 1975, pp 33–37). Note however, that if a small amount of copper is left in the steam generators, it will tend to plate on the steam generator surfaces during this passivation step.

U.S. Pat. No. 4,654,200 describes a process specific to the leaching of radium from uranium mill tailings through chelation with EDTA under strong reducing conditions. The present invention is not applicable to the uranium industry and is applied under oxidizing conditions (hydrogen peroxide), not the strong reducing conditions specified in this patent. The patent does not deal with passivation of steel surfaces.

U.S. Pat. No. 3,506,576 describes a process for cleaning a ferrous based metal surface using an aqueous alkaline solution of an alkylene polyamine polyacetic acid chelating agent with a water soluble sulfide.

U.S. Pat. No. 4,632,705 describes a process for removal of ferrous or copper-type deposits from the secondary side of nuclear steam generators. The process utilizes primary heat and boiling to transport and concentrate the cleaning agent into the restricted areas of the generator. The present invention is meant to establish a protective oxide layer on all carbon steel surfaces after a chemical cleaning. Some removal of copper-type deposit does occur as a secondary effect. The prior art process is specifically designed to remove ferrous and copper-type deposits within restricted (creviced) regions. The inventive process heats the cleaning agent using external heating systems. The prior art process heats the cleaning agent using primary loop heat. The inventive process heats the cleaning agent using primary loop heat only when needed, to establish the required application temperature of 37° to 49° C. The prior art heats the cleaning agent to induce boiling. The new process also periodically vents the steam generator to release generated gases. The prior art process reduces pressure to induce boiling and has specific pressure requirements (above and below atmospheric pressure). The invention is applied at atmospheric pressure.

U.S. Pat. No. 5,225,087 describes a process for recovery of EDTA from chemical cleaning and decontamination solutions. The EDTA is precipitated by reducing the pH to less than 2.0. The inventive process uses EDTA to establish a protective oxide layer following removal of ferrous deposits during chemical cleaning and does not suggest a process for recovery of the passivation solution to facilitate its disposal or reuse. The prior art is for recovery of the cleaning solution, once the chemical cleaning is complete, to facilitate its disposal or reuse. The inventive process is also applied in the steam generator, but the prior process is applied in tanks external to the steam generator.

Dowell Schlumberger (DS) "Passivation Of Steel In Ammonium EDTA Solution", presented Mar. 25–29, 1985, at Corrosion 85, describes a process for passivating steel after performance of a chemical cleaning. The invention utilizes hydrogen peroxide as an oxidant for the process. The DS process intentionally adds 800 ppm to 4100 ppm iron to achieve the desired concentration of ferric ions. The new process is applied in a temperature range of 37° C. to 49° C. The DS process is applied in a temperature range of 54° C. to 77° C. The inventive process does not require continuous flow of the passivating solution across the steel surface. The DS process specifies a minimum continuous flow rate across the steel surface to ensure effective passivation.

SUMMARY OF THE INVENTION

According to the present invention, a plant which is being chemically cleaned contains copper in the deposit. The final dissolution step during the chemical cleaning, prior to passivation, is a copper dissolution step that utilizes EDTA at an elevated pH and $H_2O_2$ as an oxidant. This step is applied at low temperature and, if applied according to the present invention, this same copper step can act as the passivation step, eliminating the need for any additional step to passivate the metal surfaces.

If the deposits in the steam generator being cleaned contain copper, a two solvent cleaning procedure is required. One solvent is required for copper dissolution and one solvent is required for magnetite dissolution. The magnetite dissolution solvent is applied at a temperature of 93° C. (200° F.) while the copper solvent is applied at lower temperatures (generally less than 38° C./100° F.). The magnetite and copper solvent steps can be used in any combination of alternating sequences. However, when cleaning a unit containing copper bearing deposits the final dissolution step is always a copper step. In the EPRI/SGOG method after application of the copper step, it is necessary to heat up the unit for the final EPRI/SGOG passivation step. The EPRI/SGOG copper removal step uses a solvent of the following nominal composition: EDTA—50 grams per liter; Hydrogen Peroxide—30 grams per liter; pH—9.2 to 9.5 adjusted with ammonium hydroxide and ethylenediamine (EDA); EDTA is ethylenediaminetetraacetic acid. Copper solvent starts at about 50 g/l free EDTA. When the copper concentration stops increasing, effective passivation according to the present invention can then proceed at $\leq 15$ g/l free EDTA, but with a minimum EDTA concentration of about 1 g/l. Free EDTA means EDTA not complexed with a metal. No inhibitor is required when using this solution because of the high pH and strong oxidizing properties of the solvent. The present invention uses this solution to passivate the steam generator surfaces as an extension of the copper dissolution process.

The copper application step can be applied in a manner to achieve sufficient passivation of the metal surfaces to eliminate after rusting. The elimination of the final $N_2H_4$ passivation step reduces the waste volumes and also eliminates the copper plating that occurs during this step.

The optimum application scenario for the final copper step would be to first apply the solvent in the normal manner. This would be at the nominal chemical concentrations described above at a temperature below 29° C. (85° F.). When the copper concentration stops increasing and the free EDTA falls below 15 g/l (after about 3 hours), raise the solvent temperature to about 49° C. (120° F.) and then spike the hydrogen peroxide back to about 20 g/l. This will ensure effective passivation of the metal surfaces. However, other variations, such as spiking at lower temperatures also result in metal surface passivation.

Accordingly, an object of the present invention is to provide a process for chemically passivating nuclear steam generator surfaces, comprising: following a copper removal step, applying a passivation solution to the surfaces which comprises EDTA and $H_2O_2$.

Another object of the present invention is to apply the passivation solution at a temperature of about 37° C. to 49° C.

The various features of novelty which characterize the invention are pointed out with particularity in the claims annexed to and forming a part of this disclosure. For a better understanding of the invention, its operating advantages and specific objects attained by its uses, reference is made to the following descriptive matter in which a preferred embodiment of the invention is disclosed.

DESCRIPTION OF THE PREFERRED EMBODIMENTS

The present invention comprises a process and a solution for use in the process which is typically applied following a copper removal step in a standard EPRI/SGOG or similar steam generator cleaning process. In such a process, EDTA is expected to be present. The process of the invention uses solvent makeup or reinjection in order to produce an initial hydrogen peroxide concentration in the range of 2±0.5% (w/v) $H_2O_2$ and pH of 9.0±0.5, adjusted using EDA. The surfaces to be passivated according to the invention are exposed to the solution for at least two hours at a temperature range of 37° C. to 49° C. with no more than 15 g/l of free EDTA present as $(NH_4)_2$ EDTA. Ambient pressure conditions can be used (nominally 1 bar) but there are no pressure dependent chemical constituents in the solution. The peroxide concentration and pH will fall off with time but providing the temperature is maintained in the specified range for the given time span, a passive layer ($FeO.Fe_2O_3$) will be formed. If the temperature is outside the range an effective passive layer is not obtained. In the event that a copper removal step is not required, the $(NH_4)_2$ EDTA need not be added above the 15 g/l concentration. However, the other parameters remain unchanged.

In testing performed to verify the passivation process of the present invention, two definitions of passivation were used.

DEFINITION 1: A metal active in the emf series, or an alloy composed of such metals, is considered passive when its electrochemical behavior approached that of an appreciably less active noble metal.

DEFINITION 2: A metal or alloy is passive if it substantially resists corrosion in the environments where thermodynamically there is a large free-energy decrease associated with its passage from the metallic state to appropriate corrosion products.

The copper removal/passivation solution evaluated was formulated as described above.

Electrochemical testing (AC Impedance, Zero Resistance Ammetry, and Linear Polarization) was used to determine passivation according to Definition 1. Accelerated atmospheric corrosion testing was used to evaluate the passive behavior of metals after exposure to the passivation solution. This was done to determine the passivation according to Definition 2.

The corrosion rates from all of the electrochemical measurements verified passivation, according to Definition 1, in the copper solvent evaluated. In the accelerated atmospheric corrosion testing, all specimens from the copper solvent exposures provided some degree of protection versus the control specimens (no chemical cleaning exposure). In addition, it was evident that spiking with $H_2O_2$ at an elevated temperature at the end of the copper cycle improves the performance of the resultant passive layer against rusting of the underlying carbon steel. This testing verified passivation according to Definition 2. Utilizing the final copper step as a passivation solution reduces the time of the cleaning and reduces the waste volume generation. This is accomplished by elimination of the EPRI/SGOG passivation step which requires heating and subsequent cool down of the steam generators (time savings). Waste volumes are also reduced by eliminating a step from the cleaning. A separate step, by definition, increases the waste volume generation during chemical cleaning. Another benefit is the elimination of the copper plating that can occur during the normal passivation step.

The 93° C.(200° F.) $N_2H_4$ passivation solution described previously is currently in use for nuclear steam generator chemical cleaning today. Other solutions have been used during fossil boiler application. These alternatives consist of additives such as $NaNO_2$ utilized with air sparging. Fossil cleanings also have utilized $H_2O_2$ in passivation solutions (W. W. Frenier and W. C. Kennedy, "Passivation of Steel in Ammonium EDTA Solutions," *NACE Corrosion* 85 Boston Mass., March 1985, Paper 189).

While a specific embodiment of the invention has been shown and described in detail to illustrate the application of the principles of the invention, it will be understood that the invention may be embodied otherwise without departing from such principles.

What is claimed is:

1. A method for chemically passivating nuclear steam generator surfaces, comprising the steps of:

during a copper removal step after a copper removal phase when copper concentration stops increasing;

providing a free EDTA solution in an amount of less than or equal to 15 grams per liter of solution but not less than a minimum of about 1 gram per liter of solution;

raising the solution temperature to about 37° C. to 49° C.;

spiking a hydrogen peroxide concentration back to about 2±0.5% (w/v) as a passivation solution; and exposing the nuclear steam generator surfaces to the passivation solution for a period of at least two hours.

2. A method according to claim 1, further comprising the step of adjusting the pH of the solution to about 9.0±0.5 using EDA.

3. A method for chemically passivating nuclear steam generator surfaces, comprising the steps of:

following a copper removal step when required;

applying a passivation solution to the surfaces which comprises diammonium EDTA and $H_2O_2$, the diammonium EDTA being present as free EDTA in an amount of less than or equal to 15 grams per liter of solution but not less than a minimum concentration of about one gram per liter of solution, and $H_2O_2$ being initially present in an amount of about 2±0.5% (w/v); and exposing the surfaces to the solution for a period of at least two hours and at a temperature range between 37° C. and 49° C. for passivating the surfaces as an extension of a copper dissolution process.

4. A method according to claim 1 comprising the step of adjusting the pH of the solution to about 9.0±0.5 using EDA.

* * * * *